(12) United States Patent
Vaughn et al.

(10) Patent No.: US 11,725,575 B2
(45) Date of Patent: Aug. 15, 2023

(54) METHODS AND SYSTEMS FOR AN ACCESSORY DRIVE

(71) Applicant: Ford Global Technologies, LLC, Dearborn, MI (US)

(72) Inventors: Timothy Vaughn, Woodhaven, MI (US); George Papaioannou, Livonia, MI (US); John Brevick, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 342 days.

(21) Appl. No.: 17/098,062

(22) Filed: Nov. 13, 2020

(65) Prior Publication Data

US 2022/0154636 A1 May 19, 2022

(51) Int. Cl.
*F02B 67/06* (2006.01)
*B60K 25/02* (2006.01)

(52) U.S. Cl.
CPC .............. *F02B 67/06* (2013.01); *B60K 25/02* (2013.01); *B60K 2025/022* (2013.01)

(58) Field of Classification Search
CPC .... F02B 67/06; B60K 25/02; B60K 2025/022
USPC ........................................................ 474/74
See application file for complete search history.

(56) References Cited

U.S. PATENT DOCUMENTS

| | | | | |
|---|---|---|---|---|
| 7,316,628 B2* | 1/2008 | Serkh | ..................... | B60K 25/00 475/314 |
| 8,808,124 B2* | 8/2014 | Major | ..................... | B60K 25/00 180/65.265 |
| 2008/0179119 A1* | 7/2008 | Grenn | ..................... | B60K 6/48 701/22 |
| 2011/0319214 A1* | 12/2011 | Showalter | ............... | F02N 15/02 475/149 |
| 2015/0126315 A1* | 5/2015 | Farewell | ................ | B60K 25/02 474/110 |
| 2018/0162213 A1* | 6/2018 | Colavincenzo | ......... | B60L 50/15 |
| 2019/0203637 A1 | 7/2019 | Lee | | |

FOREIGN PATENT DOCUMENTS

WO    WO-03052247 A1 *  6/2003   ............. F02B 67/06

* cited by examiner

*Primary Examiner* — Gene O Crawford
*Assistant Examiner* — Emily R Kincaid
(74) *Attorney, Agent, or Firm* — Vincent Mastrogiacomo; McCoy Russell LLP

(57) ABSTRACT

Methods and systems are provided for an accessory drive device. In one example, the accessory drive device comprises an input belt coupled to a pulley of a two-speed device and an output pulley coupled to an output belt configured to provide energy to an alternator or a belt integrated starter generator.

18 Claims, 3 Drawing Sheets

METHODS AND SYSTEMS FOR AN ACCESSORY DRIVE

FIELD

The present description relates generally to a multi-speed front end accessory drive.

BACKGROUND/SUMMARY

Front end accessory drive (FEAD) system may include one or more of a crankshaft pulley, a poly-wedge belt, a tensioner, an idler, and some driven pulleys such as an alternator or a BISG pulley, an air compressor pulley, a water pump pulley, a power steering pulley, a fan drive pulley, etc. A pulley ratio of a FEAD device maybe a balance of idle performance, max speed, and operating conditions.

The balance may result in compromises to an optimum function during some operating conditions. For example, a belt integrated starter/generator (BISG) comprise a ratio based on a maximum rotations per minute (RPM), which allows the BISG to operate at an optimum function during extreme operating conditions, such as at the maximum RPM. However, an electrical capability at park idle speeds and lower engine starting torque may be insufficient at the BISG to drive one or more accessory drives.

The FEAD system may comprise dynamic characteristics including a vibration of pulleys and a pendulum of a tensioner arm, a tension fluctuation of each belt span, slips between belts and corresponding pulleys, and the like. Increasing a tensioner damping and/or increasing a belt tension may enhance FEAD system dynamic characteristics. However, higher tensioner damping and higher material properties may lead to higher manufacturing costs. A higher belt tension may improve the natural frequency of each belt span while avoiding a resonance during a majority of engine revolutions. The higher belt tension may reduce a belt lifespan while increasing a hub load of each pulley, which may lead to fatigue and accelerated degradation of the bearings and accessory shafts.

Other examples of addressing accessory drive pulley drawbacks include a two speed accessory drive pulley. One example approach is shown by Lee in U.S. 2019/0203637. Therein, the accessory drive pulley comprises an inner race and an outer race with a wedge plate disposed therebetween that is configured to selectively lock and unlock the outer and inner races. The outer race is fixed or mounted to a housing so that the housing and outer race rotate or do not rotate together. The wedge clutch between the outer race and the inner race may rotate with the outer race while freely spinning relative to the inner race in a first position. Thus, the inner race rotates with the housing and creates a normal speed of the accessory drive pulley. In a second position, the inner race is grounded and locked to the second race, thereby creating an overdrive speed.

However, the inventors have identified some issues with the approaches described above. For example, the two speed accessory drive of Lee comprise an input from a shaft and drives a belt. This may increase packaging difficulties, resulting in further design configurations of pre-existing systems.

In one example, the issues described above may be addressed by a system comprising a front end accessory drive system comprising a plurality of components including a two-speed device, wherein the two-speed device comprises an input pulley configured to receive an input belt configured to extend around pulleys of the plurality of components, and wherein the two-speed device comprises an output pulley configured to receive an output belt configured to extend around a pulley of an alternator or a generator. In this way, redesign of a damper or other accessory drive components is not desired.

As one example, a front end accessory drive (FEAD) device comprises only the input belt and the output belt. Thus, the output or the input of the FEAD device is not a shaft which may simplify installation of the two-speed device. The two-speed device may be further configured to enhance electrical capabilities during engine speeds less than a threshold and lower engine torque amplifications via activation of an electromagnetic clutch. By doing this, fuel economy and performance enhancements of the FEAD components may be provided by the two-speed device.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIGS. 3 and 4 are shown approximately to scale, however, other relative dimensions may be used if desired.

DETAILED DESCRIPTION

Figure 1:
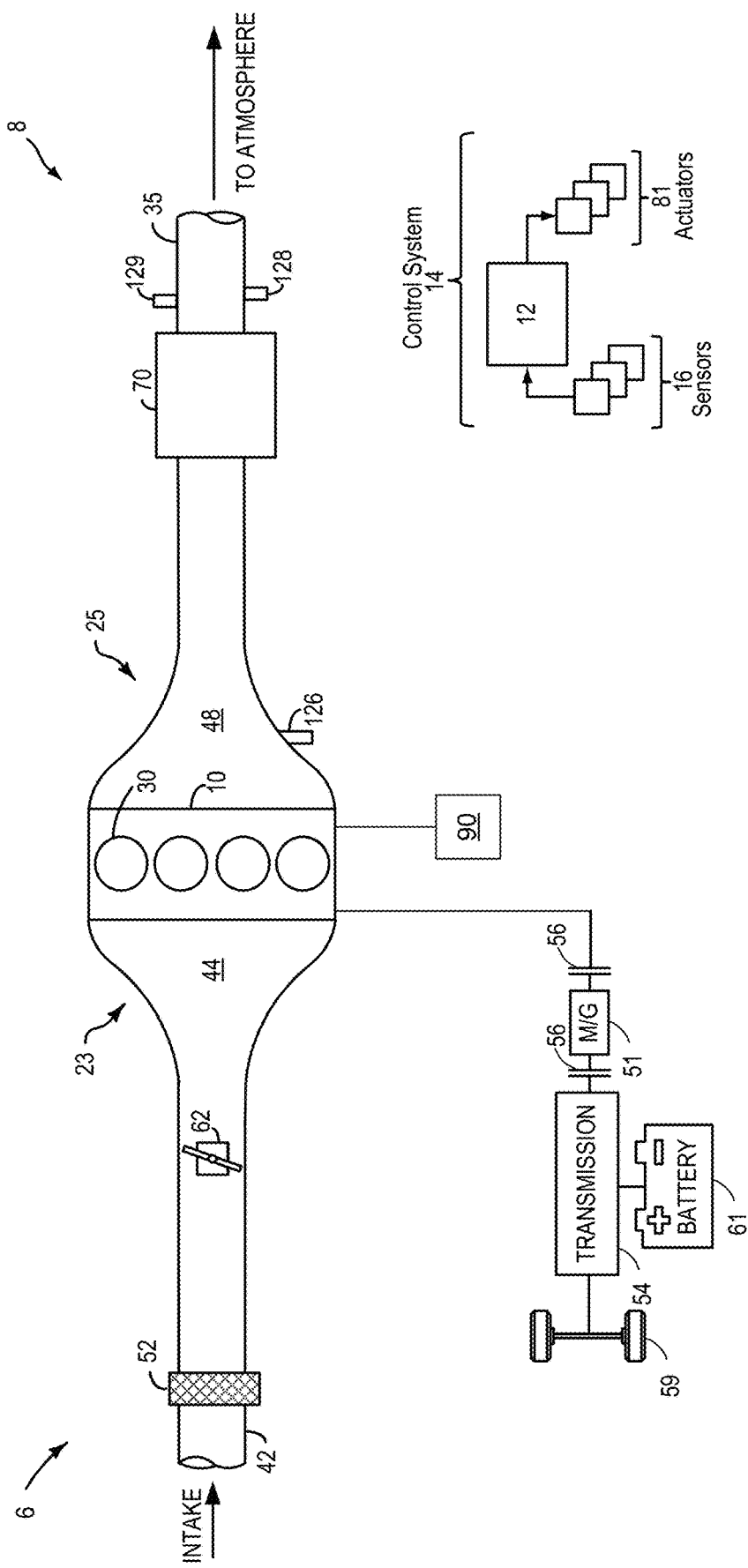
FIG. 1 illustrates a schematic of an engine included in a hybrid vehicle.
Figure 2:
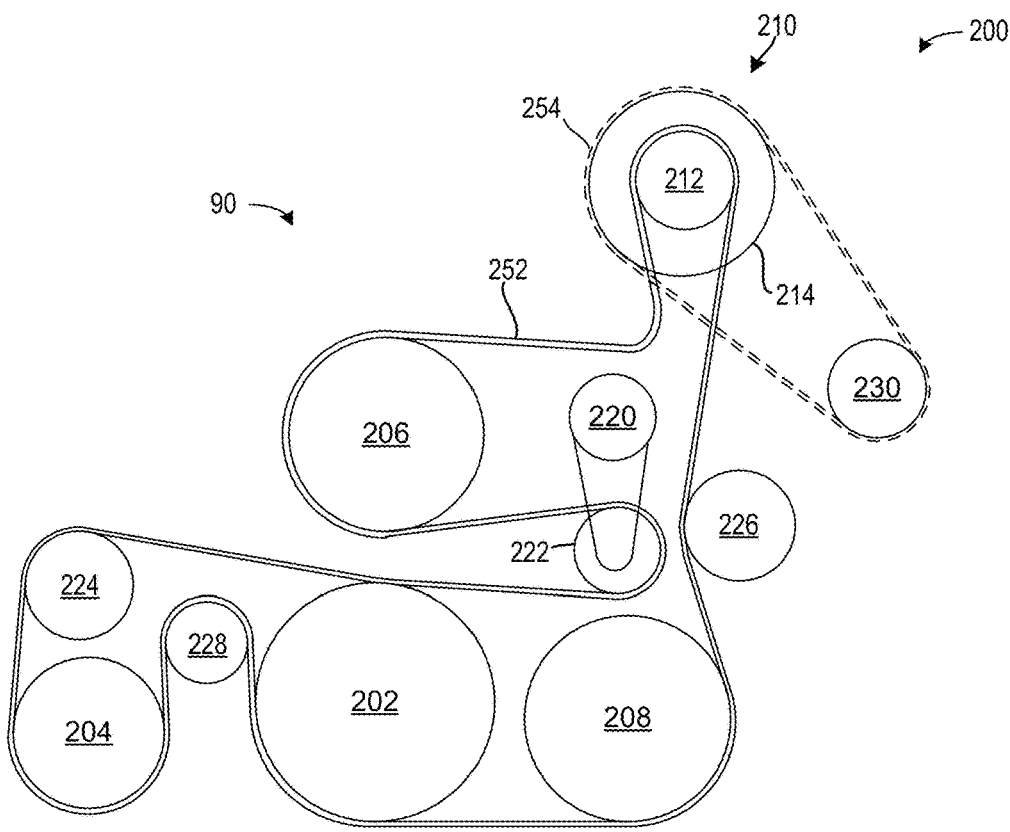
FIG. 2 illustrates a side-on view of a multi-speed front end accessory drive.
Figure 3:
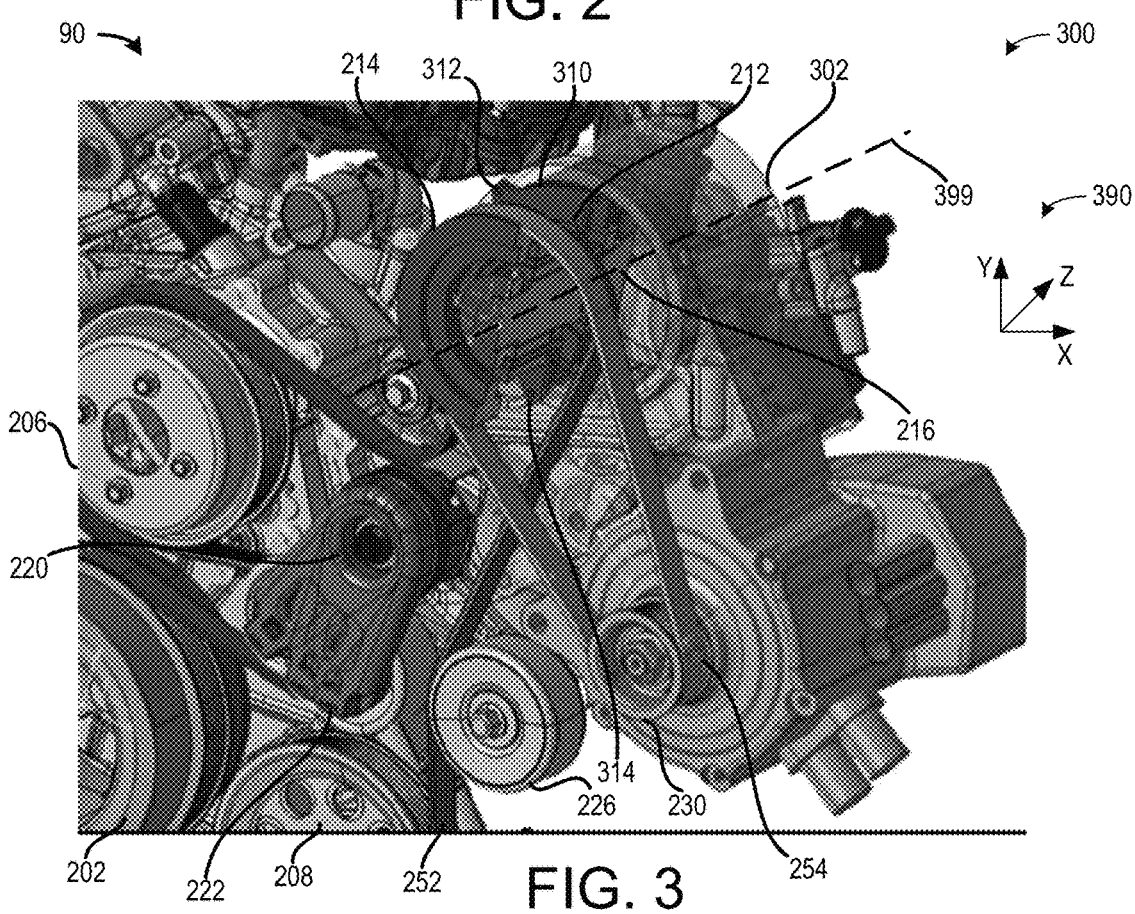
FIG. 3 illustrates a perspective view of a cutaway of the multi-speed front end accessory drive.
Figure 4:
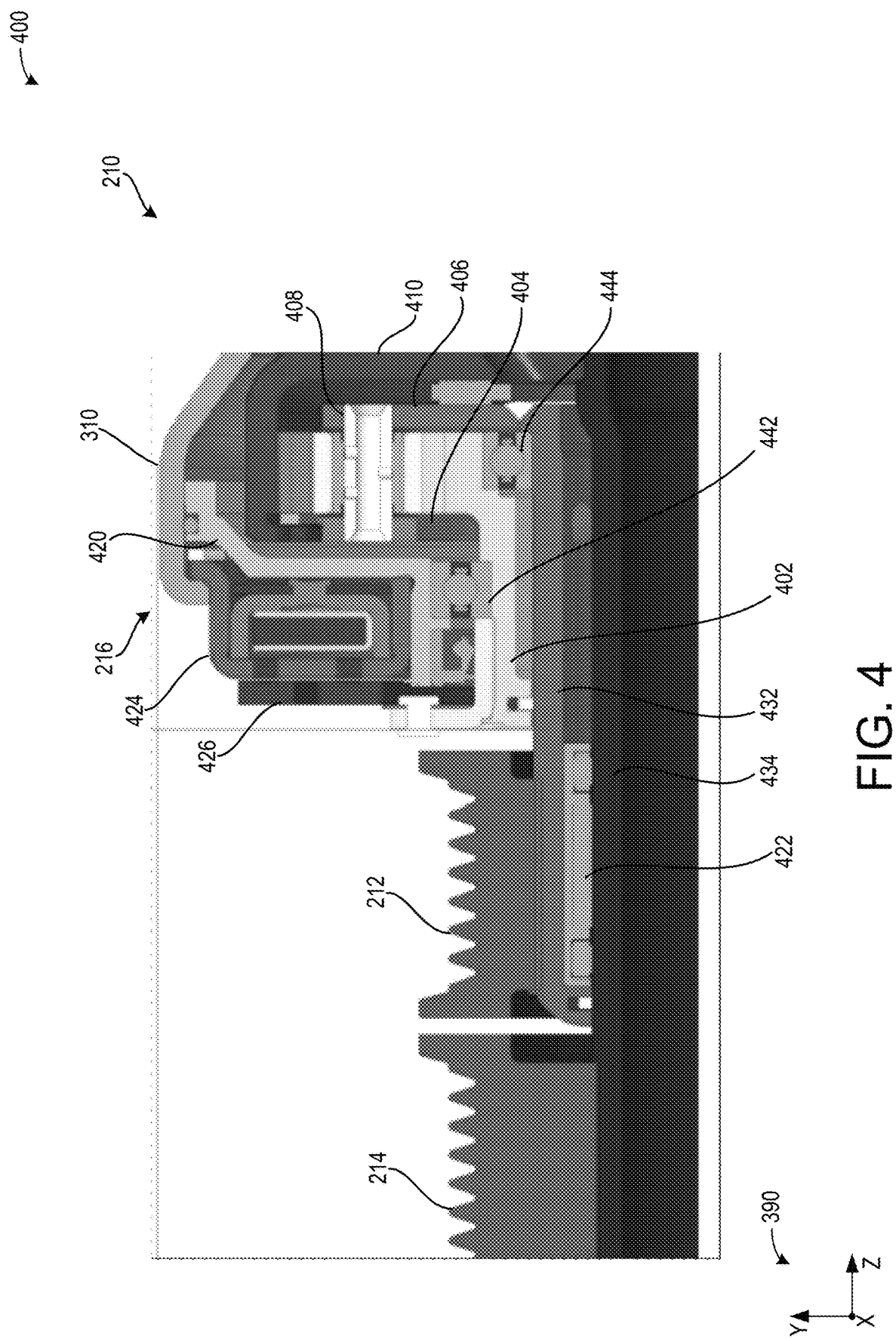
FIG. 4 illustrates a cross-sectional view of the multi-speed front end accessory drive.

The following description relates to systems and methods for a multi-speed front end accessory device (FEAD). The multi-speed accessory device may comprise an off-axis two speed (OATS) device configured to receive input energy from a crankshaft and output energy to an accessory device. The crankshaft is a crankshaft of an engine of a hybrid vehicle as illustrated in FIG. 1. The OATS device may be configured to bolt onto a pre-existing drive device such that modification to a damper or other FEAD device is not desired. An example of the OATS device arranged within a FEAD system arrangement is illustrated in FIGS. 2 and 3. A cross-section of the OATS device is illustrated in FIG. 4, which reveals a clutch and a plurality of gears.

FIGS. 1-4 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. It will be appreciated that one or more components referred to as being "substantially similar and/or identical" differ from one another according to manufacturing tolerances (e.g., within 1-5% deviation).

FIG. 1 shows a schematic depiction of a hybrid vehicle system 6 that can derive propulsion power from engine system 8 and/or an on-board energy storage device. An energy conversion device, such as a generator, may be operated to absorb energy from vehicle motion and/or engine operation, and then convert the absorbed energy to an energy form suitable for storage by the energy storage device.

Engine system 8 may include an engine 10 having a plurality of cylinders 30. Engine 10 includes an engine intake 23 and an engine exhaust 25. Engine intake 23 includes an air intake throttle 62 fluidly coupled to the engine intake manifold 44 via an intake passage 42. Air may enter intake passage 42 via air filter 52. Engine exhaust 25 includes an exhaust manifold 48 leading to an exhaust passage 35 that routes exhaust gas to the atmosphere. Engine exhaust 25 may include one or more emission control devices 70 mounted in a close-coupled position or in a far underbody position. The one or more emission control devices may include a three-way catalyst, lean NOx trap, diesel particulate filter, oxidation catalyst, etc. It will be appreciated that other components may be included in the engine such as a variety of valves and sensors, as further elaborated in herein. In some embodiments, wherein engine system 8 is a boosted engine system, the engine system may further include a boosting device, such as a turbocharger (not shown).

Vehicle system 6 may further include control system 14. Control system 14 is shown receiving information from a plurality of sensors 16 (various examples of which are described herein) and sending control signals to a plurality of actuators 81 (various examples of which are described herein). As one example, sensors 16 may include exhaust gas sensor 126 located upstream of the emission control device, temperature sensor 128, and pressure sensor 129. Other sensors such as additional pressure, temperature, air/fuel ratio, and composition sensors may be coupled to various locations in the vehicle system 6. As another example, the actuators may include the throttle 62.

Controller 12 may be configured as a conventional microcomputer including a microprocessor unit, input/output ports, read-only memory, random access memory, keep alive memory, a controller area network (CAN) bus, etc. Controller 12 may be configured as a powertrain control module (PCM). The controller may be shifted between sleep and wake-up modes for additional energy efficiency. The controller may receive input data from the various sensors, process the input data, and trigger the actuators in response to the processed input data based on instruction or code programmed therein corresponding to one or more routines.

In some examples, hybrid vehicle 6 comprises multiple sources of torque available to one or more vehicle wheels 59. In other examples, vehicle 6 is a conventional vehicle with only an engine, or an electric vehicle with only electric machine(s). In the example shown, vehicle 6 includes engine 10 and an electric machine 51. Electric machine 51 may be a motor or a motor/generator. A crankshaft of engine 10 and electric machine 51 may be connected via a transmission 54 to vehicle wheels 59 when one or more clutches 56 are engaged. In the depicted example, a first clutch 56 is provided between a crankshaft and the electric machine 51, and a second clutch 56 is provided between electric machine 51 and transmission 54. Controller 12 may send a signal to an actuator of each clutch 56 to engage or disengage the clutch, so as to connect or disconnect crankshaft from electric machine 51 and the components connected thereto, and/or connect or disconnect electric machine 51 from transmission 54 and the components connected thereto. Transmission 54 may be a gearbox, a planetary gear system, or another type of transmission. The powertrain may be configured in various manners including as a parallel, a series, or a series-parallel hybrid vehicle.

Electric machine 51 receives electrical power from a traction battery 61 to provide torque to vehicle wheels 59. Electric machine 51 may also be operated as a generator to provide electrical power to charge battery 61, for example during a braking operation.

The vehicle 6 comprises a front end accessory drive (FEAD) 90. The FEAD 90 may comprise a plurality of components, including an alternator, a water pump, a fan, power steering, air conditioning, and an integrated starter/generator. In such an example, the architecture of the vehicle may be a P1 or P2 architecture. Additionally or alternatively, a P0 architecture may be used, wherein the electric machine is integrated into the FEAD 90. The electric machine may be separate from the alternator. In one example, the electric machine 51 may be a belt-integrated starter generator (BISG), which may be configured to provide torque to a powertrain or produce electricity. In the example of the present disclosure, the FEAD 90 may comprise an input belt configured to receive energy from a crankshaft of the engine 10. The input belt may then drive one or more components of the FEAD 90 via energy from the crankshaft of the engine 10.

At any rate, as will be described in greater detail below, the FEAD 90 may comprise an off-axis two speed (OATS) device. In one example, the OATS device comprises a configuration enabling it to be bolted into the FEAD 90. By bolting on the OATS device, modifications to a damper or FEAD components may not be needed. Furthermore, the OATS device may enhance fuel economy while also enhancing performance of FEAD components.

Turning now to FIG. 2, it shows an embodiment 200 of the FEAD 90. As such, components previously introduced are similarly numbered in this figure and subsequent figures. The FEAD 90 is configured to receive an input energy from a crankshaft pulley 202. In one example, the crankshaft pulley 202 is coupled to a crankshaft of an engine, such as engine 10 of FIG. 1. The FEAD 90 further comprises an air conditioner compressor pulley 204, a water pump pulley 206, and a power steering pulley 208.

The FEAD 90 further comprises a first tensioner 220. The first tensioner 220 may be actuated to a plurality of positions to adjust a tension of an input belt 252 of the FEAD 90. By adjusting a position of the first tensioner 220, a tensioner pulley 222, around which the input belt 252 extends, may be moved. Positions of the tensioner 220 are illustrated in FIG. 3. The input belt 252 may extend around each of the crankshaft pulley 202, the air conditioner compressor pulley 204, the water pump pulley 206, and a power steering pulley 208. Additionally or alternatively, the FEAD 90 may further comprise a fan pulley, a pump pulley, or other similar component.

The FEAD 90 further comprises a first idler 224, a second idler 226, and a second tensioner 228. It will be appreciated that the first idler 224, the second idler 226, and the second tensioner 228 may be omitted from the FEAD 90. Additionally or alternatively, additional idlers and tensioners may be added to the FEAD 90.

The input belt 252 extends around an input pulley 212 of an OATS device 210. The OATS device 210 further comprises an output pulley 214 around which an output belt 254 extends. In one example, the input belt 252 and the output belt 254 may be substantially identical in material. For example, the input belt 252 and the output belt 254 may comprise an amount of elastomeric material so that the belts may comprise an amount of stretch (e.g., are stretchable). The amount of stretch may vary, wherein the stretch and/or stretchability of the belt may allow it to increase in length from a resting state. Additionally or alternatively, the input belt 252 and/or the output belt 254 may be rigid.

The second belt 254 extends around the output pulley 214 toward a belt-integrated-starter-generator (BISG) pulley 230. In some examples, additionally or alternatively, the second belt 254 may extend around an alternator pulley. The second belt 254 may output power to the BISG pulley 230, thereby driving the BISG to provide one or more hybrid capabilities to the vehicle as known to those of ordinary skill in the art.

In some examples, additionally or alternatively, the input belt 252 may extend around a first set of input pulleys of the plurality of components of the FEAD 90. The output belt 254 may extend around a second set of output pulleys of the plurality of components of the FEAD 90. In one example, the second set includes only one output pulley of a component of the plurality of components and the first set includes a remaining number of components of the plurality of components. The OATS device may be configured to provide two-speed functionality to one component or multiple components of the FEAD 90. Additionally or alternatively, as described above, the FEAD 90 may be configured to provide two-speed functionality to the BISG or to an alternator.

Turning now to FIG. 3, it shows a perspective view 300 of the FEAD 90. In the perspective view 300, the first tensioner 220 is illustrated actuating between a first extreme position and a second extreme position. The first extreme position includes the first tensioner 220 biased toward the water pump pulley 206. The second extreme position includes the first tensioner 220 biased toward the second idler 226. The first tensioner may be actuated to the first extreme position, the second extreme position, or a position therebetween to adjust operation of one or more of the components in contact with the input belt 252.

The input belt 252 extends around the input pulley 212 of the OATS device 210. The output belt 254 extends around the output pulley 214 of the OATS device 210. In the examples of FIGS. 2 and 3, a diameter of the output pulley 214 is greater than a diameter of the input pulley 212. In some examples, additionally or alternatively, the diameter of the output pulley 214 may be less than or equal to the diameter of the input pulley 212.

The OATS device 210 further comprises a gear assembly 216. The input pulley 212 is arranged between the gear assembly 216 and the output pulley 214. As such, the input pulley 212 is closer to the gear assembly 216 than the output pulley 214.

An axis system 390 comprising three axes, namely an x-axis parallel to a horizontal direction, a y-axis parallel to a vertical direction, and a z-axis normal to the x- and y-axes. A central axis 399 extends through a center of the OATS device 210. The OATS device 210 is referred to as an off-axis device in that the OATS device 210 may be mounted to the FEAD system 90 independent of other axes of the FEAD system 90. That is to say, the central axis 399 may be offset to and/or misaligned with axes of the plurality of devices in the FEAD system 90.

In the example of FIG. 3, the OATS device 210 is mounted to a bracket 302 via a plurality of fasteners including a first fastener 312 and a second fastener 314. The first fastener 312 and the second fastener 314 extend through through-holes of an outer surface 310 and through-holes of the bracket 302. In one example, one or more components of the FEAD system 90 may also be mounted onto the bracket 302. As such, the bracket 302 may retain a configuration similar to that utilized in a single-speed FEAD system. The first fastener 312 and the second fastener 314 may be bolts, screws or other similar fasteners. By utilizing a bolt-on configuration, the OATS device 210 may be serviced and installed easily without reconfiguration of other components of the FEAD system 90.

Turning now to FIG. 4, it shows a cross-section 400 taken along a Y-Z plane of axis system 390. The cross-section 400 reveals an interior of the OATS device 210, including the gear assembly 216. The gear assembly 216 comprises a gear set including a sun gear 402, a planetary gear set including a first carrier gear 404 and a second carrier gear 406, a carrier 408, a ring gear 410, a first bearing 442, a second bearing 444, and an inner wall 420.

The inner wall 420 may be configured to block lubricant from escaping an interior volume 450 of the gear assembly 216. The interior volume 450 may comprise one or more grooves arranged in the carrier gear 406, the ring gear 410, and the sun gear 42, and a first shaft 432 to enhance lubrication of the various components of the gear assembly 216. Furthermore, the gear assembly 216 comprises a first seal 452 configured to block The gear assembly 216 further comprises a one-way clutch 422 arranged in an interior of a first shaft 432. The first shaft 432 drives through the sun gear 402, the first carrier gear 404, and to the ring gear 410. The ring gear 410 drives a second shaft 434, which drives the output belt coupled to the output pulley 214. By doing this, an overspeed operation may be achieved, wherein a speed of the ring gear 410 is greater than an input speed provided by the first shaft 432. As such, a speed of the second shaft 434 may be greater than the speed of the first shaft 432.

The gear assembly 216 further comprises an electromagnetic clutch 424 connected to a housing (e.g., the inner wall 420 and the outer surface 310), wherein activation of the electromagnetic clutch 424 may attract an armature 426 via a magnetic field. The armature 426, which is in contact with the sun gear 402, may match a speed of a rotor of the electromagnetic clutch 424, which may be driven through a second carrier gear 406, to the ring gear 410, and to the second shaft 434. In one example, this may generate an underspeed operation, wherein a speed of the ring gear 410, and therefore a speed of the second shaft 434, matches a speed of the first shaft 432.

In one example, the underspeed operation is desired during an engine speeds less than a threshold or lower engine starting torque amplification. In one example, the threshold is 2,000 rotations per minute (RPM). As another example, additionally or alternatively, the threshold is 1,500 RPM. As such, a method of operation of the OATS device may include activating the electromagnetic clutch to enhance electrical capabilities during the engine idle or the lower engine starting torque amplification. The overspeed operation is desired during higher engine speeds or higher torque operations. During the overspeed operation, the electromagnetic clutch is deactivated and the one-way clutch is engaged to provide a 1 to 1 speed ratio.

In this way, the OATS device provides a FEAD system with two-speed capabilities in a compact and easy to install configuration. The OATS device comprises a first belt configured as an input belt and a second belt configured as an output belt. The OATS device may be bolted onto a portion of the FEAD system in an orientation independent of other axes of the FEAD system. The technical effect of bolting the OATS device onto the FEAD system is to reduce manufacturing and installation costs while providing the FEAD system with enhanced FEAD component performance and improved fuel economy.

An example of a system comprises a front end accessory drive system comprising a plurality of components including a two-speed device, wherein the two-speed device comprises an input pulley configured to receive an input belt configured to extend around input pulleys of one or more of the plurality of components, and wherein the two-speed device comprises an output pulley configured to receive an output belt configured to extend around a pulley of an alternator, a generator, or an output pulley of a component of the plurality of components.

A first example of the system further includes where the plurality of components includes a crankshaft and a crankshaft output pulley, and wherein the input belt extends around the crankshaft output pulley.

A second example of the system, optionally including the first example, further includes where the input belt is longer than or shorter than the output belt.

A third example of the system, optionally including one or more of the previous examples, further includes where the input belt is the only input device of the front end accessory device system.

A fourth example of the system, optionally including one or more of the previous examples, further includes where the two-speed device is mounted to a bracket of the front end accessory drive via a plurality of fasteners.

A fifth example of the system, optionally including one or more of the previous examples, further includes where the plurality of fasteners extend through a gear housing of the two-speed device.

A sixth example of the system, optionally including one or more of the previous examples, further includes where the gear housing comprises a plurality of gears, a one-way clutch and an electromagnetic clutch.

An example of a front end accessory drive system comprises a two speed device comprising an input pulley and an output pulley, wherein the input pulley rotates via energy provided via a first belt and wherein the output pulley rotates a second belt configured to rotate a belt-integrated starter/generator pulley, an alternator, or a component of the front end accessory drive system, and wherein the two-speed device is physically coupled to a mount of the front end accessory drive system via a plurality of bolts.

A first example of the front end accessory drive system further includes where the two speed device is an off-axis two speed device, and wherein the off-axis two speed device is physically coupled to the mount independent of axes of components of the front end accessory drive system.

A second example of the front end accessory drive system, optionally including the first example, further includes where the one or more of the first belt and the second belt is stretchable.

A third example of the front end accessory drive system, optionally including one or more of the previous examples, further includes where the output pulley is arranged further away from an engine than the input pulley.

A fourth example of the front end accessory drive system, optionally including one or more of the previous examples, further includes where the output pulley is arranged closer to an engine than the input pulley.

A fifth example of the front end accessory drive system, optionally including one or more of the previous examples, further includes where the two speed device comprises a gear assembly comprising a sun gear, a planetary gear set, a ring gear, a one-way clutch, and an electromagnetic clutch.

A sixth example of the front end accessory drive system, optionally including one or more of the previous examples, further includes where a gear assembly housing comprises through-holes through which the plurality of bolts extend.

A seventh example of the front end accessory drive system, optionally including one or more of the previous examples, further includes where a tensioner configured to actuate through a plurality of positions, wherein the first belt extends around a tensioner pulley of the tensioner.

A further example of a system comprises an engine comprising a crankshaft, an accessory drive system comprising a plurality of components, wherein a first set of the plurality of components is driven via an input belt, the input belt extending around a crankshaft pulley of the crankshaft, and an off-axis two speed device mounted to a bracket of the accessory drive system via a plurality of bolts misaligned with axes of the plurality of components, wherein the off-axis two speed device comprises an input pulley around which the input belt extends and an output pulley around which an output belt extends.

A first example of the system further includes where the output belt provides energy to a belt-integrated starter generator pulley, to an alternator pulley, or to a second set of the plurality of components.

A second example of the system, optionally including the first example, further includes where there are no other energy inputs and outputs other than the input belt and the output belt.

A third example of the system, optionally including one or more of the previous examples, further includes where the off-axis two speed device comprises an electromagnetic clutch, wherein the electromagnetic clutch is activated during engine speeds less than a threshold speed and lower engine torque amplifications, wherein the threshold speed is 1,500 rpm.

A fourth example of the system, optionally including one or more of the previous examples, further includes where the input pulley of the off-axis two speed device is arranged in front or behind the output pulley relative to the engine.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system, comprising:
a front end accessory drive system comprising a plurality of components including a two-speed device, wherein the two-speed device comprises an input pulley configured to receive an input belt configured to extend around input pulleys of one or more of the plurality of components, and wherein the two-speed device comprises an output pulley configured to receive an output belt configured to extend around a pulley of an alternator, a generator, or an output pulley of a component of the plurality of components, wherein the input belt is the only input device of the front end accessory device system and extends around a crankshaft pulley.

2. The system of claim 1, wherein the input belt is longer than or shorter than the output belt.

3. The system of claim 1, wherein the two-speed device is mounted to a bracket of the front end accessory drive via a plurality of fasteners.

4. The system of claim 3, wherein the plurality of fasteners extend through a gear housing of the two-speed device.

5. The system of claim 4, wherein the gear housing comprises a plurality of gears, a one-way clutch and an electromagnetic clutch.

6. A front end accessory drive system, comprising:
a two speed device comprising an input pulley and an output pulley, wherein the input pulley rotates via energy provided via a first belt extending around pulleys of a crankshaft and a plurality of components of the front end accessory drive system, and wherein the output pulley rotates a second belt configured to rotate a belt-integrated starter/generator pulley, an alternator, or a component of the front end accessory drive system, and wherein the two-speed device is physically coupled to a mount of the front end accessory drive system via a plurality of bolts.

7. The front end accessory drive system of claim 6, wherein the two speed device is an off-axis two speed device, and wherein the off-axis two speed device is physically coupled to the mount independent of axes of components of the front end accessory drive system.

8. The front end accessory drive system of claim 6, wherein one or more of the first belt and the second belt is stretchable.

9. The front end accessory drive system of claim 6, wherein the output pulley is arranged further away from an engine than the input pulley.

10. The front end accessory drive system of claim 6, wherein the output pulley is arranged closer to an engine than the input pulley.

11. The front end accessory drive system of claim 6, wherein the two speed device comprises a gear assembly comprising a sun gear, a planetary gear set, a ring gear, a one-way clutch, and an electromagnetic clutch, and wherein the plurality of components of the front end accessory drive system comprises one or more of an air conditioner pulley, a water pump pulley, and a power steering pulley around which the first belt extends.

12. The front end accessory drive system of claim 11, wherein a gear assembly housing comprises through-holes through which the plurality of bolts extend.

13. The front end accessory drive system of claim 6, further comprising a tensioner configured to actuate through a plurality of positions, wherein the first belt extends around a tensioner pulley of the tensioner.

14. A system, comprising:
an engine comprising a crankshaft;
an accessory drive system comprising a plurality of components, wherein a first set of the plurality of components is driven via an input belt extending around pulleys thereof, the input belt extending around a crankshaft pulley of the crankshaft; and
an off-axis two speed device mounted to a bracket of the accessory drive system via a plurality of bolts misaligned with axes of the plurality of components, wherein the off-axis two speed device comprises an input pulley around which the input belt extends and an output pulley around which an output belt extends.

15. The system of claim 14, wherein the output belt provides energy to a belt-integrated starter generator pulley, to an alternator pulley, or to a second set of the plurality of components.

16. The system of claim 14, wherein there are no other energy inputs and outputs other than the input belt and the output belt.

17. The system of claim 14, wherein the off-axis two speed device comprises an electromagnetic clutch, wherein the electromagnetic clutch is activated during engine speeds less than a threshold speed and lower engine torque amplifications, wherein the threshold speed is 1,500 rpm.

18. The system of claim 14, wherein the input pulley of the off-axis two speed device is arranged in front or behind the output pulley relative to the engine.

* * * * *